(12) United States Patent
Rabelo et al.

(10) Patent No.: US 6,577,960 B1
(45) Date of Patent: Jun. 10, 2003

(54) LIQUID GAUGING APPARATUS USING A TIME DELAY NEURAL NETWORK

(75) Inventors: Luis C. Rabelo, Eden Prairie, MN (US); Mark Walker, Mission Viejo, CA (US); Radoslaw R. Zakrewski, South Burlington, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 239 days.

(21) Appl. No.: 09/615,455

(22) Filed: Jul. 13, 2000

(51) Int. Cl.[7] .............................................. G01F 17/00
(52) U.S. Cl. .............................. 702/55; 706/15; 706/23
(58) Field of Search .............................. 702/55; 706/15, 706/23

(56) References Cited

U.S. PATENT DOCUMENTS

| | | | |
|---|---|---|---|
| 4,426,616 A | 1/1984 | Maier | 324/658 |
| 4,965,731 A | 10/1990 | Weitz, Jr. | 701/123 |
| 4,968,946 A | 11/1990 | Maier | 324/671 |
| 5,832,468 A | * 11/1998 | Miller et al. | 706/16 |
| 6,157,894 A | * 12/2000 | Hess et al. | 702/141 |

FOREIGN PATENT DOCUMENTS

| | | |
|---|---|---|
| CH | 683208 A5 | 3/1992 |
| DE | 4223346 A1 | 7/1992 |
| WO | WO99/32857 | 7/1999 |

OTHER PUBLICATIONS

Elements of Artificial Neural Networks (Kishan Mehrotra, Chilukuri K. Mohan, Sanjay Ranka) pp. 139–141 (MIT Press).

Fundamentals of Artificial Neural Networks (Mohamad H. Hassoun) pp. 254–259 (MIT Press).

\* cited by examiner

*Primary Examiner*—John Barlow
*Assistant Examiner*—Anthony Dougherty
(74) *Attorney, Agent, or Firm*—David R. Percio; Calfee, Halter & Griswold LLP

(57) ABSTRACT

Liquid gauging apparatus using a time delay neural network for determining a quantity of liquid in a container that is not directly measurable by sensors is disclosed. The apparatus comprises a plurality of sensors and a processor. Each of the sensors are capable of measuring a respective parameter of the liquid and for producing a time varying sensor output signal representative of the respective parameter measured thereby. The processor is programmed to process the sensor output signals by a time delay neural network algorithm to determine a current quantity of the liquid in the container based on current and past parameter measurements of the sensor output signals. Also disclosed is a method of training a time delay neural network algorithm for computing a quantity of liquid in a container from current and past liquid parameter sensor measurements. The method comprises the steps of: establishing a dynamic model of liquid behavior in the container and parameter measurements of the liquid behavior sensed by a plurality of sensors; deriving from the dynamic model training data sets for a plurality of liquid quantity values, each data set comprising current and past liquid parameter sensor measurement values corresponding to a liquid quantity value of the plurality, and the corresponding liquid quantity value; and training the time delay neural network algorithm with the derived training data sets.

55 Claims, 5 Drawing Sheets

LIQUID GAUGING APPARATUS USING A TIME DELAY NEURAL NETWORK

CROSS REFERENCE TO RELATED APPLICATIONS

This patent application is related to the following U.S. patent applications: application Ser. No. 08/996,858, entitled "Liquid Gauging Using Sensor Fusion and Data Fusion"; application Ser. No. 08/996,747, entitled "Improved Ultrasonic Liquid Gauging System"; application Ser. No. 08/997,444, entitled "Probe Placement Using Genetic Algorithm Analysis", now U.S. Pat. No. 6,006,604; application Ser. No. 08/997,137, entitled "Blackboard Centric Layered Software Architecture For An Embedded Airborne Fuel Gauging System"; application Ser. No. 08/997,271; entitled "Universal Sensor Interface System and Method"; all of which applications filed on Dec. 23, 1997 and owned in common by the assignee of the instant application, the entire disclosures of which being fully incorporated herein by reference.

BACKGROUND OF THE INVENTION

A liquid gauging system using a static neural network has been disclosed in the above referenced co-pending U.S. patent application Ser. No. 08/996,858 (hereinafter the "858 Application"). In the 858 Application, a system was disclosed for estimating a quantity of liquid in a container, which could not be measured directly, using a neural network with inputs based on the parameter measurements of a plurality of sensors at a single instant in time, i.e. a single snapshot of sensor output values. The performance of such static neural network liquid gauging systems have been considered adequate, but inherently limited due to the lack of accounting for transient conditions. For those liquid container systems affected by motion, the snapshot of sensor measurement data does not uniquely determine the state of the system during transients, like attitude changes due to acceleration, for example, which may lead to a degradation in the estimation of liquid quantity by the neural network during such conditions.

Aircraft fuel tanks, for example, undergo attitude changes frequently during flight which render the fuel surface in motion causing such conditions as fuel slosh, liquid surface vibration and wave motion just to name a few. Under these conditions, the sensor fuel measurements may lag the attitude or acceleration measurement rendering an input pattern different from that for which the neural network was trained. Such surface effects are not taken into account during training thereof. Consequently, the static neural network may estimate a different quantity of liquid than what actually exists in the tank.

In addition, the sensors of a liquid gauging system generally include built in damping that may cause the liquid parameter measurements thereof to lag behind any rapid changes in liquid state. Accordingly, even such transient conditions as a rapid change in liquid quantity due to a transfer of liquid between containers, for example, may lead to inaccurate liquid quantity estimates from the static neural network. Not only are the errors associated with such dynamic effects not accounted for during training, but any additional information available from such effects which may make the quantity determination of the static neural network more reliable from a training perspective are effectively filtered out as a result of such built in sensor damping.

Accordingly, what is most desirable is a liquid gauging system that can take into account not only the current sensor parameter measurements, but past sensor parameter measurements as well. Including past histories of the parameter measurements will result in an improved liquid quantity estimate even if the most recent sensor measurements alone do not provide for an actual current state of the liquid due to transient conditions such as those exemplified above. The present invention provides for such an improvement in performance.

SUMMARY OF THE INVENTION

In accordance with one aspect of the present invention, liquid gauging apparatus using a time delay neural network for determining a quantity of liquid in a container that is not directly measurable by sensors comprises: a plurality of sensors; each of said sensors for measuring a respective parameter of said liquid and for producing a time varying sensor output signal representative of the respective parameter measured thereby; and processing means for processing said sensor output signals by a time delay neural network algorithm to determine a current quantity of the liquid in the container based on current and past parameter measurements of said sensor output signals.

In accordance with another aspect of the present invention, a method of training a time delay neural network algorithm for computing a quantity of liquid in a container from current and past liquid parameter sensor measurements comprises the steps of: establishing a dynamic model of liquid behavior in the container and parameter measurements of said liquid behavior sensed by a plurality of sensors; deriving from said dynamic model training data sets for a plurality of liquid quantity values, each said data set comprising current and past liquid parameter sensor measurement values corresponding to a liquid quantity value of the plurality, and said corresponding liquid quantity value; and training said time delay neural network algorithm with said derived training data sets.

DETAILED DESCRIPTION OF THE INVENTION

Figure 1:
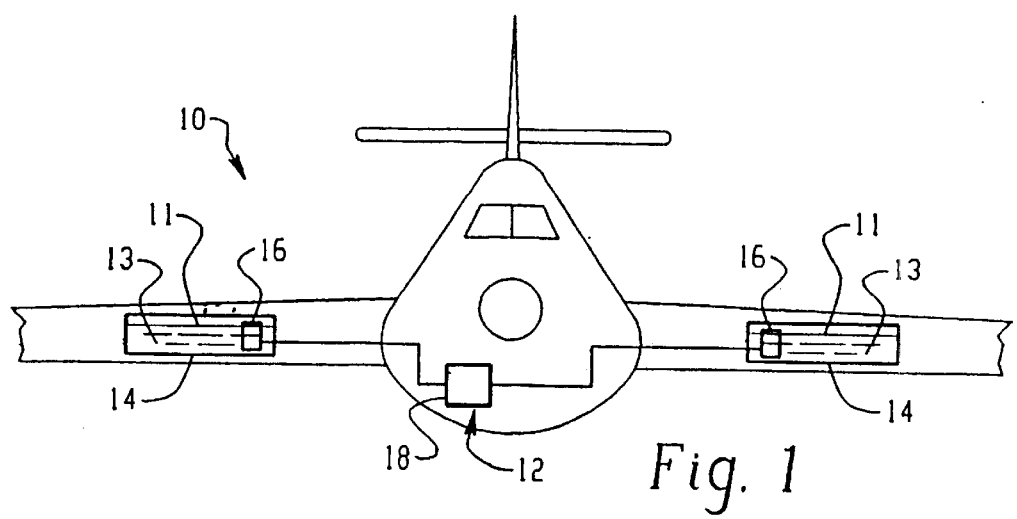
FIG. 1 is an illustration of an exemplary application of an embodiment of the present invention.

With reference to FIG. 1, an embodiment of the invention is illustrated in an exemplary application, in this case for fuel gauging on an aircraft. Although the invention is described herein specifically in the context of aircraft fuel gauging, this is for purposes of illustration and explanation and should not be construed in a limiting sense. Those skilled in the art will appreciate that the present invention will have application to any liquid gauging application in which it is desired to determine the quantity of liquid in a container.

In FIG. 1 an aircraft 10 is shown with an on-board fuel measurement/gauging apparatus 12 in accordance with the present invention. In this example, the gauging apparatus 12 is used to determine quantity of a fuel 13 in one or more fuel tanks 14 of the aircraft. The term "quantity" as used herein, either as fuel quantity or liquid quantity, refers to a quantification of the liquid 13 that defines its volume, weight, mass or combination thereof that is not directly measurable from sensors. The basic relationships are:

$$\text{Mass} = \text{Volume} * \text{Density or } M = V * \rho \qquad \text{Eq. 1}$$

and $$\text{Weight} = \text{Mass} * \text{Acceleration or } W = M * a. \qquad \text{Eq. 2}$$

The volume and/or mass of the fuel 13 in a tank 14 is of particular interest because the total fuel mass determines the energy available to power the aircraft 10 and determining volume is generally a prerequisite to determining mass. Direct volume or mass sensors in a dynamic environment such as an airplane are not available. Therefore, volume and/or mass quantities are derived from measurements and calculations of other parameters of the fuel 13 including density, acceleration and fuel height in the tank, for example. These and other parameters are either measured by various sensors 16 (collectively designated in FIG. 1) including but not limited to capacitive probe sensors, pressure sensors, ultrasonic level sensors, accelerometers and temperature sensors, or derived from such measurements and other calculations. As used herein, a parameter of the liquid in the container, or a "liquid parameter" includes any characteristic of the liquid that can be measured, detected or derived by calculation or other technique. More particularly, a measured or detected liquid parameter includes any characteristic of the liquid (such as, for example, echo travel time, temperature, pressure, capacitance and so on) and/or an external parameter that acts on the liquid, such as for example, force of acceleration. These various parameters are exemplary in nature and are not intended to be exclusive or limiting in any sense. A derived parameter of the liquid is any parameter or characteristic or property of the liquid that is determined or calculated or otherwise derived from one or more of the measured parameters and/or other information available to the system, such as., for example, fuel plane height, density, and velocity of sound (VOS). Again these derived parameters are exemplary in nature and should not be construed in a limiting sense.

In one embodiment of the present invention, some, one or all of the sensors 16, like conventional capacitive probe sensors, for example, may be disposed inside a tank 14 if the sensor design so dictates. In another embodiment of the present invention, however, it is contemplated that all of the sensors 16 will be non-intrusive, meaning that none of the sensors will need to be exposed electrically to the fuel 13 and/or otherwise installed or disposed inside a tank 14. In general, a non-intrusive sensor for purposes of this disclosure is a sensor that can be installed at and removed from its operational location with a tank 14 without having to remove fuel 13 from the tank 14 or without significant loss of fuel from the tank 14 when a sensor is removed, and/or is a sensor that operates without exposing the fuel 13 to electrical energy. But, it is important to note that the invention can be used with intrusive sensors also, if a particular application so requires.

The sensors 16 produce outputs, typically in the form of electrical signals, which are coupled or input to a fuel gauging processor 18. Typically, the processor 18 will be a computer or functionally similar electronic hardware and software combination that processes the sensor 16 outputs and determines quantity of the fuel 13 in a tank 14 in accordance with the techniques of the present invention.

Figure 2:
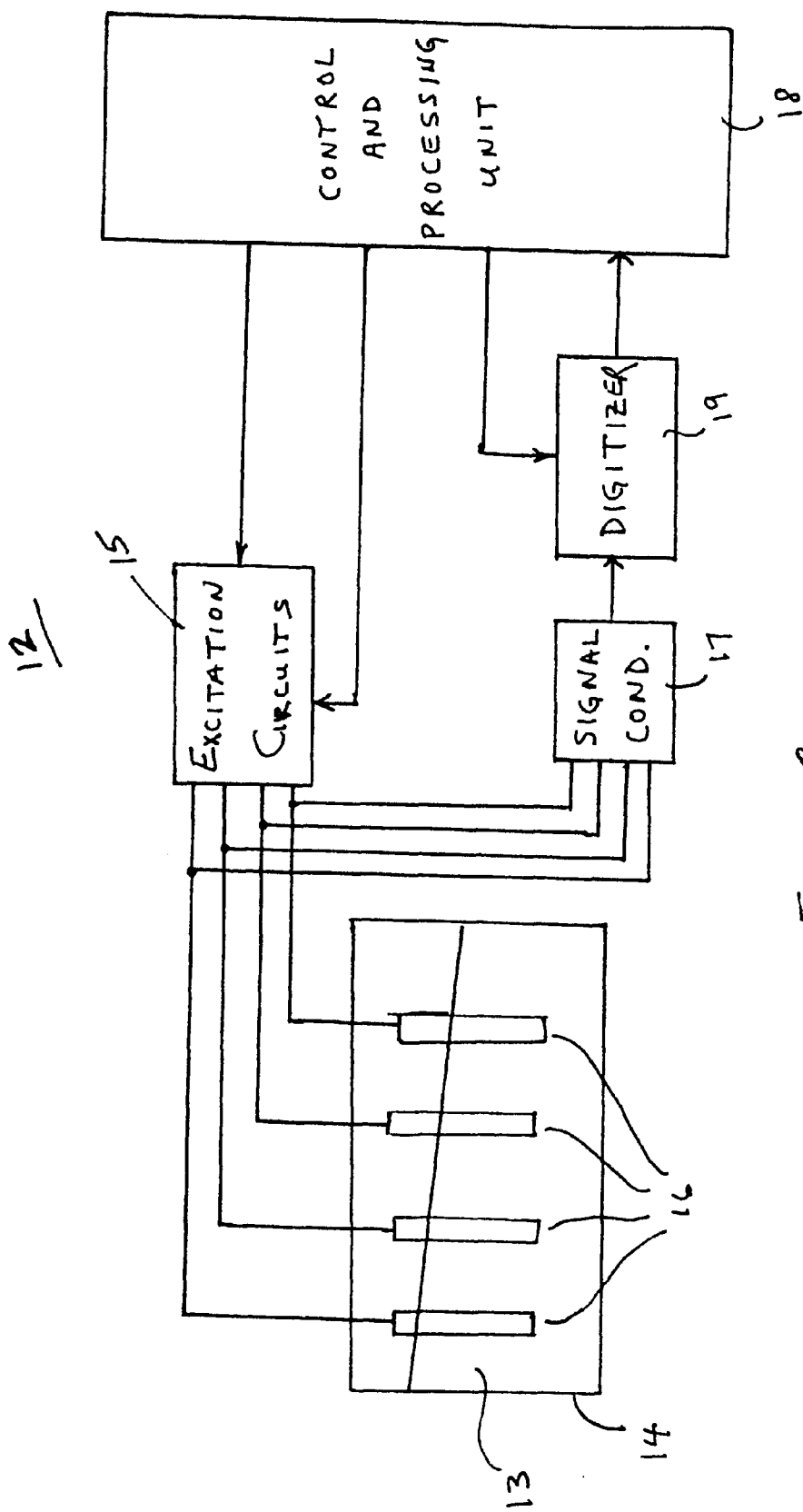
FIG. 2 is a block diagram illustration of an embodiment of the present invention.

With reference next to an embodiment of the present invention which is depicted in FIG. 2, the fuel gauging apparatus 12 includes a plurality of liquid level sensors 16 which, for this embodiment, may be conventional capacitive probe sensors, for example, disposed at various locations in the tank 14 for measuring the height of the liquid 13 at such locations. While only four sensors are shown in the present embodiment, it is understood that more or less than four may be used without deviating from the principles of the present embodiment. Each probe 16 typically includes a structure of concentric tubes with the dielectric constant between the tubes, and thus capacitance, determined by the level of the liquid in the container at the location of the sensor. Thus, the sensed capacitance of each sensor 16 is a function of the liquid level at its location. Conventionally, the capacitive probe sensors 16 are coupled to conventional excitation circuits 15 that excite the sensors 16 with a time varying waveform signal. Signals output from the sensors 16 in response to the excitation stimuli are coupled to signal conditioning circuits 17 which may include transconductance and voltage amplifiers, filters and the like, for example. The conditioned output signals from the circuits 17 may be digitized, in the present embodiment, by a conventional digitizer 19 before being processed by the digital processor unit 18 to determine the quantity of liquid in the container 14 as described above.

There may be an excitation circuit for each sensor 16 in which case the process may control each in parallel. Or, in the alternative, there may be just one excitation circuit which may be multiplexed to excite each sensor in a sequential manner as controlled by the processor 18. In addition, each sensor 16 may be coupled to an individual signal conditioning circuit and the outputs thereof selected to be digitized by the digitizer 19 under the control of the processor 18. Or, in the alternative, each sensor output signal may be individually selected to be conditioned by a single signal conditioning circuit and the selected conditioned output thereof digitized by the digitizer 19 under control of the processor 18. Other circuit combinations may also be used to measure the capacitance of the level sensors 16 and provide the measured parameters to the processor 18. Accordingly, the present invention should not be limited in any way to the particular sensor used to measure liquid level in the container nor the excitation and signal conditioning of the signals to and from the sensors, respectively.

Also, some capacitive probe sensors may include a resistive element which may be measured in any conventional manner and provided to the processor 18 for providing compensation of the capacitive parameter measurements. Other such systems compensate for temperature of the liquid. Even inaccuracies in system excitation and signal conditioning components due to time and temperature varying conditions may be compensated for through techniques of auto-calibration and self-calibration with reference resistance and/or capacitance elements. For a more detailed explanation of capacitive probe sensors, and their excitation and signal conditioning reference is made to the U.S. Pat. Nos. 4,626,616 and 4,968,946 to Lawrence Maier and assigned to the same assignee as the instant application which are incorporated by reference in the instant application for providing the structural and operational details of such liquid level sensing systems.

Figure 3:
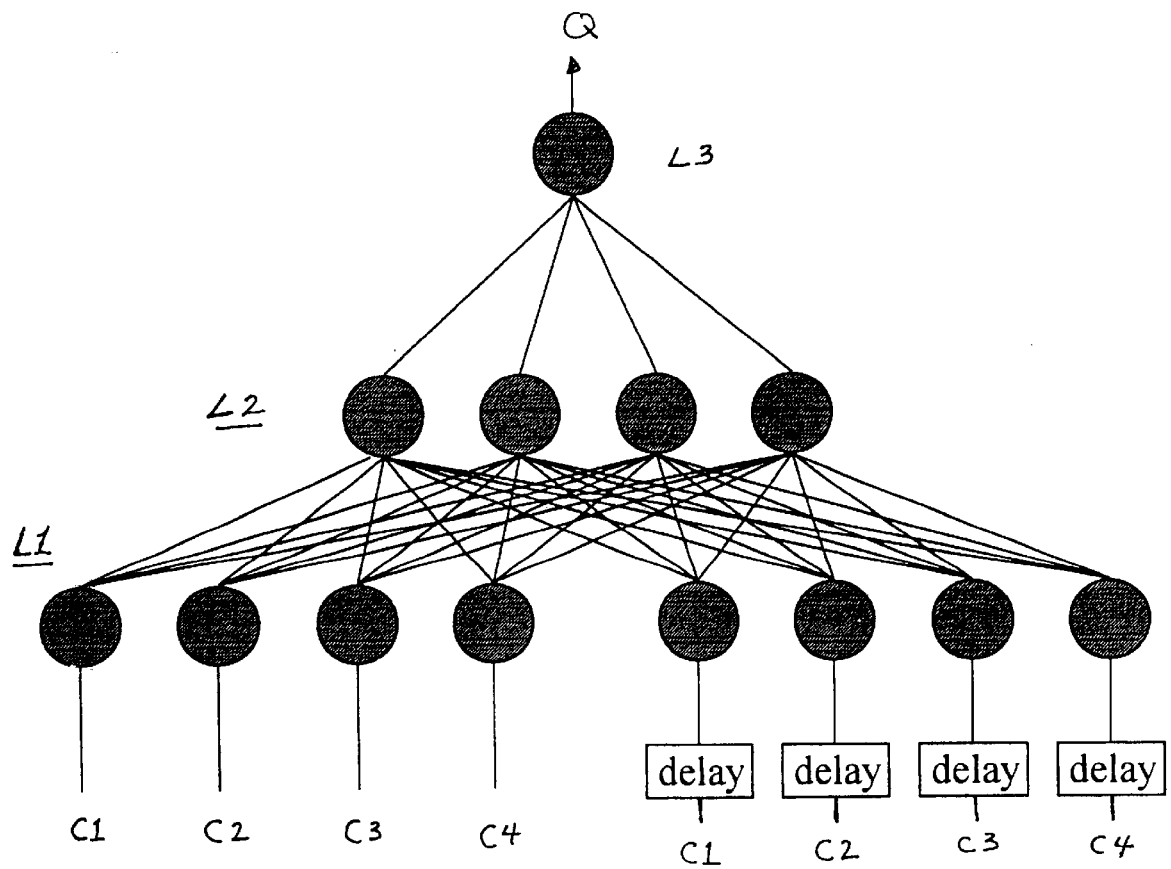
FIG. 3 is an illustration of a time delay neural network suitable for use in the embodiment of FIG. 2.

A time delay neural network algorithm that may be programmed into the processor 18 of the present embodiment improves the processing of the capacitive sensor measurements as described herein above to determine liquid quantity by taking into account the dynamic fluid surface effects, like slosh or periodic wave motion, which commonly occur, especially in aircraft fuel tank environments as well as liquid quantity changes due to rapid draining or filling of the tank. An example of a time delay neural network suitable for use in the algorithm executable by the processor 18 for the present embodiment is shown in the functional diagram of FIG. 3. Referring to FIG. 3, the time delay neural network algorithm of the present embodiment includes a first layer of nodes or neurons at L1 that accommodate discrete current and time delayed sensor output signals C1–C4 through a proper weighting of each measurement signal. In the present embodiment, each sensor measurement C1–C4 is delayed by a time delay unit by a predetermined increment of time d to provide for a set of past measurements. It is understood that the measurements C1–C4 may be delayed by more than one delay unit and for each increment in time delay, there will be another set of past measurements and corresponding input nodes for the processing thereof by the neural network algorithm. Outputs of the nodes of the first layer are distributed to and accumulated at the nodes or neurons of a second or hidden layer L2 using an appropriate weighting in each case. And finally, the outputs of the nodes of the second layer are accumulated at a single node or neuron of a third or output layer to effectively map time trajectories of current and past parameter measurements to liquid volume and/or mass quantity output Q. In this way, past values of the parameter measurements as well as their increments over time may be used as part of the neural network functional mapping. The structure and operation of such a time delay neural network algorithm will become more evident in the following paragraphs.

Variations of the above described neural network embodiment include a number of time delayed units for each sensor or parameter measurement which number shall depend on how far in historical time the time trajectories are to be propagated. Another parameter to be determined is the delay time or incremental period of time d, of each delay unit. Some of the delay units may have a delay time d set higher or lower with respect to each other, i.e. they need not be equal, while for other sensors, no delay units may be needed. In the present embodiment with all of the sensors being capacitive probes having substantially the same response times, the delay units may be set to delay the sensor measurements C1–C4 substantially the same incremental time delay. Conceptually, the expected value of each current capacitance measurement $C_i$ (t) is not only related to each other current capacitance measurement $C_j$ (t), i≠j, but also related to each past capacitance measurement $C_i$ (t-d) and $C_j$ (t-d). From these current and past parameter measurements, an appropriate neural network mapping of capacitance to liquid volume and/or mass within the container may be learned.

Figure 4:
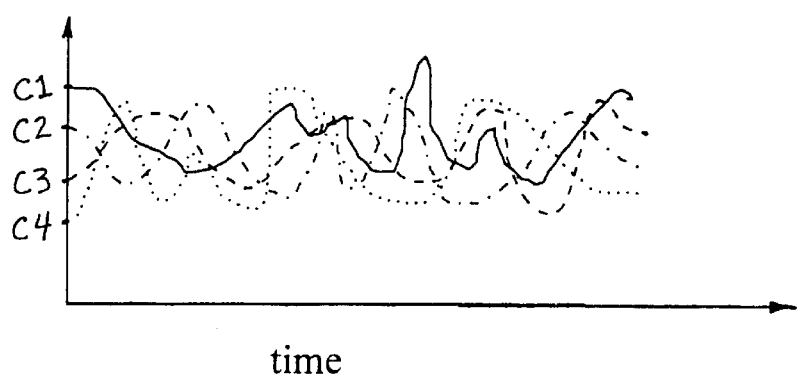
FIG. 4 is a time graph illustrating past histories of liquid parameter measurements.

In the present embodiment, the sensor output signals may be sampled by the digitizer 19 under control of the processor 18 at a rate consistent with the preferred delay times to yield discrete time trajectories of the current and past parameter measurements of each of the sensor probes which may be stored in a memory of the processor 18 for processing by the neural network algorithm thereof. In the alternative, each of the sensor measurement signals may be conducted to a tapped delay line wherein the tapped outputs become the time delayed parameter measurements provided to the programmed digital processor 18. In any event, the current and/or past measurement samples may be digitized in any conventional manner before being stored in memory. Preferably, only a predetermined number of samples is used for processing by the neural network algorithm, i.e. a sliding window in time of samples, to determine the liquid quantity. Accordingly, with each new or current sample, the oldest sample may be shifted out of the delay line or written over or discarded from memory. A time trajectory of capacitance measurements from a probe over the range C(t) to C(t-nd) would represent a richer feature set for neural network mapping of capacitance to volume (mass) than based solely on instantaneous measurements C(t). An example of a set of time trajectories of the sensor measurements C1–C4 is shown in FIG. 4.

The foregoing described time delay neural network algorithm may be trained according to a training set of values based on a dynamic model of the liquid behavior. This model may be either determined analytically (i.e. from the equations of motion for liquids in an accelerating container) or empirically over some range of accelerations. In the case of the latter, the parameter measurements and other data may be collected either in a laboratory setting or in an actual environment, and then used to construct an appropriate simulation model for generation of training data. Training data may incorporate known sensor characteristics, including any hardware or software compensation. Training of time delay neural networks will become better understood from the description found herein below.

Figure 5:
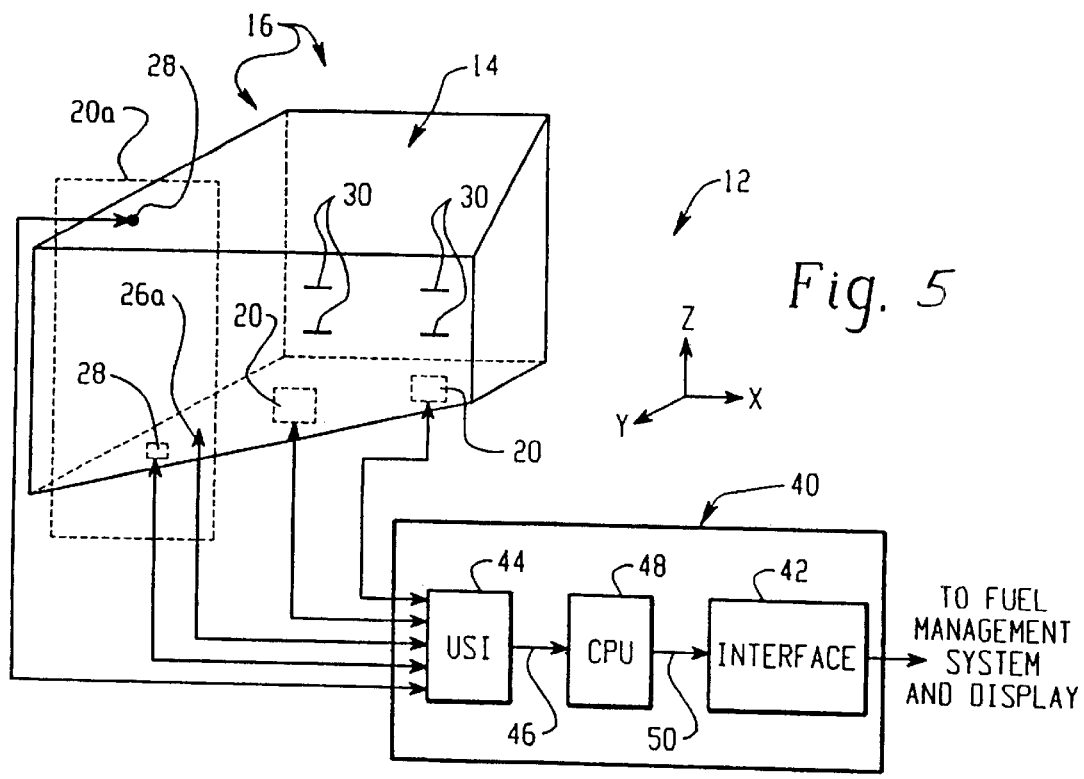
FIGS. 5 and 5A are block diagram illustrations of an alternate embodiment of the present invention.
Figure 5A:
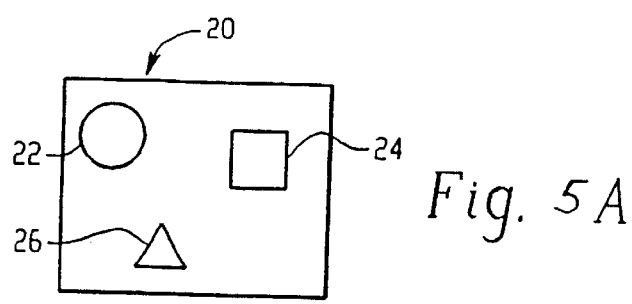

In another embodiment of the present invention, the fuel gauging apparatus 12 includes a different plurality of sensors 16 which are in FIGS. 5 and 5A illustrated in more detail as to organization. For this embodiment, it is contemplated that a number of sensor suites 20 will be used with a fuel tank 14. Each sensor suite 20 includes, in one embodiment, an ultrasonic level sensor 22, a temperature sensor 24 and an accelerometer 26. Another sensor suite 20a (indicated by the dashed box 20a in FIG. 5) is embodied in the form of a differential pressure sensor 28 and another accelerometer 26a. In the event that fuel stratification is to be taken into consideration (due to temperature stratification, for example), additional pressure sensor suites can be used at different heights within the tank 14. Although, it is understood that different groupings of the sensors 16 may be used, or that the sensors not be physically grouped at all without deviating from the broad principles of the present invention.

The ultrasonic type sensor suites 20, of which there are two used in this example, respectively include a pair of acoustic targets 30. The targets are used to permit a determination of the velocity of sound (VOS) through the fuel 13 (see FIG. 1). The targets 30 can be disposed inside the tank 14 and are simply physical elements that serve as acoustic energy reflectors. It is contemplated that rigid fixed structural elements that are inherently part of the tank 14 design (such as for example, pipes, walls an so on) can be conveniently used for the acoustic targets 30, thereby obviating any need to add any structures to the tank 14 interior.

As noted herein, it is preferred but not required that all the sensors 22, 24, 26, 26a and 28 be non-intrusive. In FIG. 5A the sensors 22, 24 and 26 are schematically represented using different geometric shapes (e.g. a circle for the ultrasonic sensor 22, and a triangle for the accelerometer 26) to emphasize that the invention contemplates the use of a number of different sensors that detect or measure different parameters of the fuel, such as pressure, acceleration and temperature. The particular grouping of various sensors into "suites" is also not a requirement to practice the present invention. Different groupings can be used, or the sensors not physically grouped at all.

Design details of each ultrasonic sensor used in a suite 20 are disclosed in the above incorporated United States patent application bearing application Ser. No. 08/996,747. However, the sensors 16 need not be organized as sensor suites, and can be conventional devices. A suitable ultrasonic sensor 22 could also be part no. 20182-0101 available from Simmonds Precision Aircraft Systems, Inc.; a suitable temperature sensor 24 is a standard temperature sensor such as part no. 8752 available from Norwich Aerospace; a suitable pressure sensor 28 for sensor suite 20a is part no. 19C030A-4 available from Sensym Inc.; and a suitable accelerometer 26 is part no. ADXL05EM-3 available from Analog Devices. The accelerometer 26 is preferably a three axis accelerometer that outputs acceleration information as the aircraft maneuvers. The pressure sensor 28 is preferably disposed at the maximum depth of the tank 14, and conveniently can be a differential pressure sensor so that the pressure measurement is inherently compensated for ullage and ambient pressures.

The gauging system 12 further includes a computer system 40. The computer system 40 may be part of the airplane fuel management system computer (not shown), or a separate processing unit that interfaces with the fuel management system through an appropriate interface function 42. The computer system 40 includes a hardware and software architecture that controls the overall operation of the fuel gauging system 12, including control of the sensor 16 operation, executive management of the various fusion algorithms, and control of the interface with down stream processing functions. Details of a suitable software architecture for the computer system 40 are provided in the above incorporated pending patent application bearing application Ser. No. 08/997,137. The present invention, however, does not depend on nor does it require the use of an overall executive computer system 40 as part of the fuel gauging system 12. Rather, the present invention is directed to liquid gauging using time delay neural network concepts, carried out by a processor 48, that can be implemented in combination with or apart from an overall fuel gauging computer system such as the system 40. The computer system 40 includes a universal sensor interface (USI) section 44. The main function of the USI 44 is to control and activate the various different sensors 16 and to receive, process and format the outputs from the various sensors 16. The USI 44 provides the sensor 16 output signals in the form of a data stream 46 to the processor 48 that includes a time delay neural network algorithm. A detailed description of the USI 44 section is provided in the above incorporated U.S. patent application bearing application Ser. No. 08/997,271. However, the present invention does not require use of the USI 44, but rather can alternatively utilize any of a number of conventional circuits well known to those skilled in the art that process the raw sensor 16 output signals and present the sensor 16 output information in a format that is compatible as an input to the processor 48. Delay units of a tapped delay line associated with the output of each sensor may be included as part of the USI 44, if desired. In the alternative, such delay line processing may be carried out on samples of the outputs of the sensors by algorithms of the processor 48.

The processor 48 carries out the functional and computational aspects of the present invention based on the data stream received from the sensors 16. The processor 48 may be the main processing unit for the computer system 40, or can be a parallel or interfaced separate processing device (thus comprising a computer system 40 for the gauging apparatus 12) with its own hardware and software to carry out the functions described herein after. A suitable processor could be part no. 80486 processor available from Intel Corporation. Thus, the present invention, in terms of the fuel gauging apparatus 12, contemplates use of a processor 48 that receives the sensor 16 outputs and determines fuel quantity in one or more of the tanks 14. This processor 48 and its related functions can be integral with or separate from or utilized without the overall higher level computer system 40 architecture described in the above incorporated patent applications. The processor 48 can be realized in the form of a microprocessor, a RISC processor, DSP or combinations thereof, for example.

The processor 48 provides an output 50 that can be in any format compatible with the overall fuel management system that will use the data for further analysis and display. It is contemplated that the processor output 50 will include values that indicate quantity of fuels 13 in each tank 14 (or a cumulative quantity for all the tanks 14) expressed in terms of mass and/or volume as required, which quantity values are derived or calculated from a time delay neural network algorithm. The processor output 50 may also include past parameter measurement values that are determined from time delay units of the various sensor 16 outputs as will become more evident from the description below. For a more detailed description of the above described sensors and computer system reference is made to the copending U.S. patent application bearing application Ser. No. 08/996,858 which is incorporated by reference into the instant application for providing such description.

As used herein, the term "system model" refers to numerous aspects of the overall system 12 design, including but not limited to the system equations, tank geometry, sensor location, sensor outputs representing parameter measurements, sensor inaccuracies and system dynamics (e.g. acceleration and environment). Thus, in general, a system model refers to a set of relationships, mathematical or otherwise, between current and past parameter measurements and quantity of liquid in the tank.

A neural network algorithm provides estimates of the desired outputs that are based on statistical analysis and inherent uncertainties and variances of not only the sensor measurements but also system uncertainties that are not static and possibly cannot be directly known or predicted. The time delay neural network algorithm used in the present embodiment does not even require that the system mapping be solved every time the measurements are sampled or updated (at each τ interval). For example, in this embodiment, the neural net does not actually compute or solve the system equations, although the neural net is trained by data sets that inherently are governed by the system equations. To the extent that sensor inaccuracies, variances and system uncertainties are known and/or can be estimated with some accuracy, the time delay neural network techniques provide an even more accurate estimate of the desired output.

As described with reference to FIG. 5, the sensors 16 of the fuel gauging apparatus 12 in the exemplary embodiment are stimulated and their outputs are processed by the USI 44 and the corresponding parameter measurement data is provided to the processor 48 in the form of a measurement vector $z_m$. The sensors 16 include two ultrasonic sensors that transmit acoustic energy to and receive acoustic echoes from the liquid surface 11, which echoes have measured round trip elapsed times of $t_{1f}$ and $t_{2f}$. The ultrasonic sensors also detect echoes from their respective VOS targets 30, and the corresponding echo travel times are measured as $t_{11VOS}$, $t_{12VOS}$, $t_{21VOS}$, $t_{22VOS}$. The sensors 16 include three temperature sensors 26, 26a that produce outputs that are processed into measurement data outputs $T_{u1}$, $T_{u2}$ and $T_p$. The u1 and u2 subscripts refer to sensors or data associated with the ultrasonic sensor suites 20, and the P subscript refers to sensors associated with the pressure sensor suite 20a. The sensors 16 also include the three accelerometers 26, 26a. Each accelerometer produces three output signals for the x, y and z components of the local acceleration vector, or $[a_x,a_y,a_z]u1$, $[a_x,a_y,a_z]u2$ and $[a_x,a_y,a_z]P$. The differential pressure sensor 28 produces an output that is processed to measurement output P. The measurement matrix $z_m$ therefore is a nineteen element vector as follows:

$$z_m{}^t\{t_{11VOS}\ t_{12VOS}\ t_{21VOS}\ t_{22VOS}\ t_{1f}\ t_{2f}\ T_{u1}\ T_{u2}\ T_P P\ a_{u1}\ a_{u2}\ a_p\}.$$

where a refers to the respective three axis accelerometer data for each of the sensor suites (a total of 9 accelerometer output values in all). These nineteen measured parameters and the past measurement parameters thereof are provided as a measurement vector that is input to respective input nodes of a first layer of a time delay neural net suitable for use in the present embodiment and exemplified in the illustration of FIG. 7.

Figure 6:
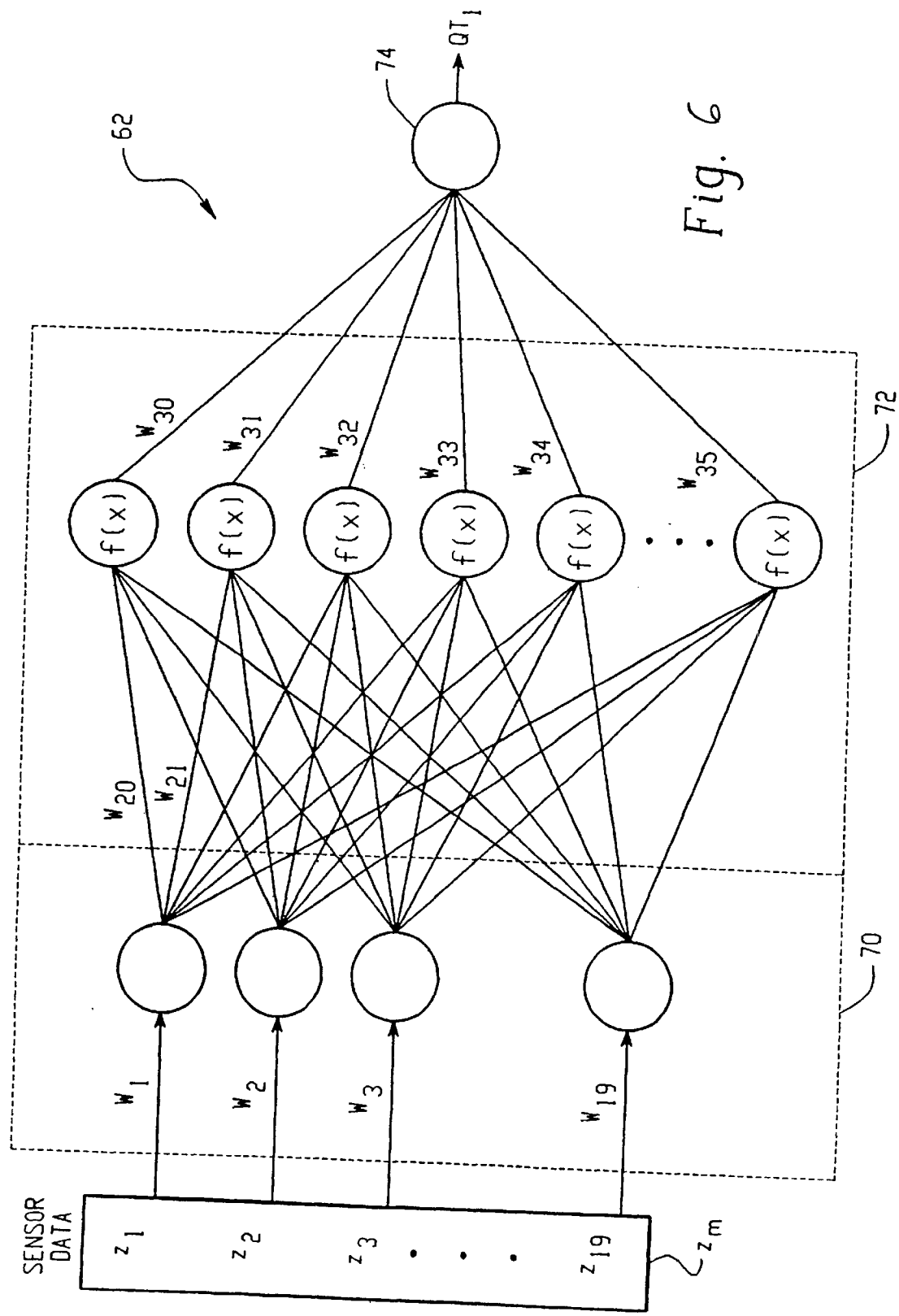
FIG. 6 is an illustration of a no-delay neural network suitable for use in providing background for the alternate embodiment of FIG. 5.

Before describing a time delay neural network, an exemplary no-delay neural network algorithm will be described using the diagram illustrated in FIG. 6 to lay the proper groundwork. With reference to FIG. 6, the exemplary neural net that may be also executed by the processor 48 is a feed forward three layer perceptron and receives the measurement vector $z_m$ with each of the nineteen measurement elements $z_1$ through $z_{19}$ connected to a respective input node of the input layer 70 of the neural net. Each input value is weighted by a respective weight $W_1$, $W_2$, ..., $W_{19}$. The neural net 62 includes one hidden layer 72 in this embodiment, with forty nodes, for example, in the hidden layer 72. Each of the input nodes in the input layer 70 is connected to each of the nodes in the hidden layer (in FIG. 6 most of the hidden layer connections have been omitted for clarity). Each of the connections between the nodes is also weighted, as is shown (again, most of the weight designations in FIG. 6 are omitted for clarity). Thus, an input to each of the nodes in the hidden layer 72 is a sum of all the weighted outputs from the nodes in the input layer 70. The neural net 62 also includes, in this embodiment, a single node output layer 74.

Each of the nodes in the hidden layer 72 are connected by weights to the output node layer 74. Thus, the input to the single node in the output layer 74 is the sum of all the weighted outputs from each of the nodes in the hidden layer. The output node 74 produces the desired output $QT_1$ of quantity of fuel in the tank 14, in this case in terms of mass. Values move in the forward direction only in this neural net 62, from input nodes to the output node 74 through the nodes in the hidden layer 72. Values move from every node in the hidden layer 72 to the output node 74 by operation of a non-linear activation function f(x). In this exemplary embodiment, the activation function f(x) is the same for each node in the hidden layer 72 and is the sigmoidal function:

$$f(x)=1.0/[1+e^{-x}]$$

In other words, each hidden layer 72 node input, call it x, is the sum of all the weighted inputs from all the nodes in the input layer 70, and each hidden layer 72 node output is the sigmoidal function f(x). Other activation functions can be selected if appropriate for a particular application. The activation function of the output node is simply a linear sum function so that the output $QT_1$ of the output node 74 is simply the sum of all the weighted inputs received from each node in the hidden layer 72, and provides the quantity in units of volume and/or mass. Note also that liquid density could be a second output node of the neural net 62.

The present invention comprises an extension of the no-delay neural network described hereabove in connection with FIG. 6. There, we also estimated a quantity not measured directly, based on multiple output values of sensors related to the quantity of interest. However, in that mapping the neural net was fed only sensor output values from a current time instant. Consequently, the neural net calculation is based on a single snapshot of sensor output values, and disregards any previous values. This may lead to deteriorated performance during transients, when a snapshot of sensor data does not uniquely determine the state of the system. The present invention comprises a time delay neural network that is fed sensor values from the current and past time instants. Therefore, the net takes into account history of the parameter measurements and is able to provide a better estimate even if the most recent sensor values alone do not allow (because of transient conditions) a reconstruction of a tank state.

The internal structure of a time delay neural network (TDNN) discussed herein may be similar to a regular or static feedforward neural network, like the one described in connection with FIG. 6 above. The time delay network has a first or input layer 80 and one or more second or hidden layers 82. All neurons in the hidden layer 82 are fed with and accumulate all outputs from the input layer 80. If more than one hidden layers are used, all neurons in each subsequent hidden layer are fed outputs of all neurons of the preceding hidden layer. Then, the neuron or neurons in the output layer 84 are fed with outputs of all neurons in the last hidden layer. The structure of a net with a single hidden layer 82 and with a single output neuron 84 looks similar to the exemplary embodiment of FIG. 7.

One difference between the TDNN and the no-delay neural net described supra is in the set of inputs. Suppose there are N sensors, each supplying a reading $z_i$. In the static case, the net was just fed N sensor values $z_1(t)$, $z_2(t)$, ..., $Z_N(t)$, corresponding to the current time instant t. But, in case of the TDNN, the net is fed not only the current sensor values from time t, but also past sensor outputs from time t-d, t-2d, t-3d, etc., where d is the time delay time increment which may be the sampling interval of the system as described above. In this example, the TDNN will have a maximum delay of M time instants. Thus, the total number of inputs fed into the TDNN will be N*(M+1)—that is N sensor values for each of M+1 time instants. In the more straight forward embodiment of FIG. 3, N=4 (four height sensors) and M=1 (just one delay).

The concept of TDNN does not require that all N*(M+1) sensor parameter measurements be fed into the neural net. For example, sensor parameter measurements from some past sampling times might be skipped—one might envision a neural net fed with sensor parameter measurements from times t, t-d, t-2d, t-4d, t-8d. In addition, the number of delayed sensor outputs might be different for each sensor. If the output of a particular sensor may change rapidly, then its parameter measurements from times t, t-d, t-2d, t-3d, t-4d might be used. At the same time, if output signals from another sensor change more slowly, only its parameter measurements from times t and t-4d might be used. For yet another sensor, whose output changes very slowly, only the current parameter measurement from time t might be used, i.e. the delayed signal would not be present at all. Regardless of such variations, the neural network would still be considered a TDNN. What distinguishes a TDNN for this explanation is that for at least one sensor its parameter measurements from two different time instants will be fed into the net.

Figure 7:
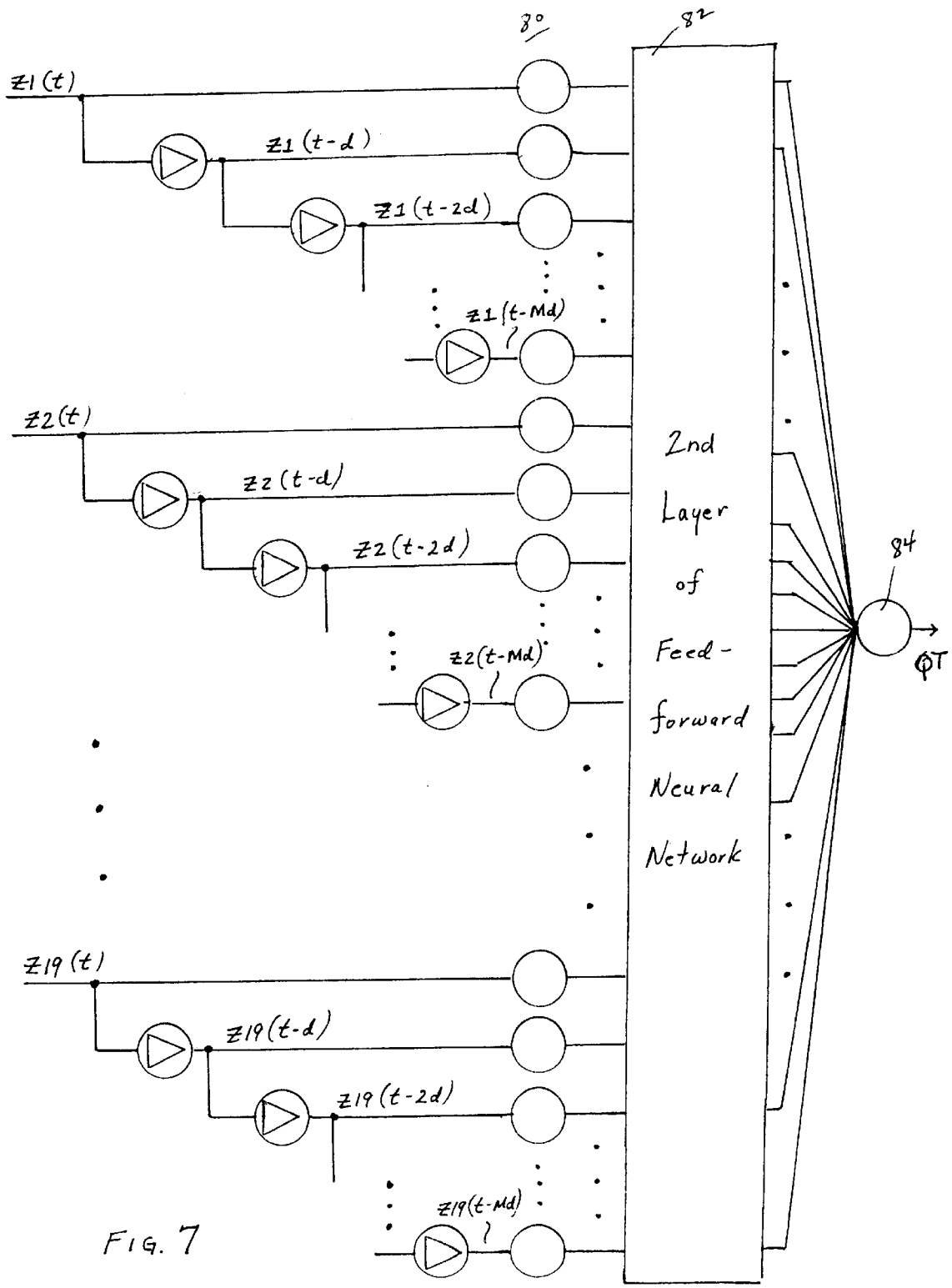
FIG. 7 is a block diagram illustration of a time delay neural network suitable for use in the alternate embodiment of FIG. 5.

A time delay neural network algorithm, such as an algorithm that implements the network illustrated in the diagram of FIG. 7, for example, uses the outputs from the sensors 16 (the outputs are collectively shown as a measurement vector $z_m$ which includes outputs $z_1, z_2, \ldots, z_n$, where n is the number of sensors or $z_{m\hat{i}(z1)}, z_2, \ldots, z_n$). Each paramater measurement of the vector $z_m$ may be updated at a respective rate defined by d, where d is the predetermined respective time delay increment determined by the system designer and may be controlled by the processor 48. The TDNN algorithm may be programmed into the processor 48 for processing the current and past parameter measurements to produce an output that is representative of the quantity QT of fuel in the tank 14 associated with the sensors 16 in the same manner as described for the embodiment depicted in FIG. 6.

The time delay neural network (also referred to herein as a neural net) is an estimator that does not use a computational system model in its operation (although the neural net is trained based on input data derived or developed from a system model or analysis) but rather system model relationships are inherently accounted for within the training and learning process that is based on a dynamic system model of current and past measured parameters and behavior data. The output from the time delay neural net is the desired output $QT_1$ or liquid quantity. The output $QT_1$ is computed directly from the measurement vector $z_m$ (i.e. the sensor 16 outputs as shown in FIG. 5) through non-linear activation functions. It is important to note that, although in the described embodiment herein the time delay neural net algorithm is used to compute the fuel 13 quantity in the tank 14 (see FIGS. 1 and 5), the same neural net or an additional neural net (not shown) could be used to provide additional outputs such as the intermediate parametric values including but not limited to liquid density, pressure, temperature and so on.

Training the TDNN is much more difficult than for purely static feedforward nets. The difference is that now a single training point consists of N sensor measurements from the current time instant, as well as from M past time instants. Therefore, the training set needs to be much larger. It has to cover not only the range of possible values of each sensor, but also the range of their possible variations in time. Because of that, training set generation is much more difficult. In case of static feedforward nets, the simulation model describes only "snapshots" of the system—that is dependence of sensor outputs on instantaneous state. In TDNN, the simulation model also includes dynamics of the state. One possible way to generate the training set is to use the dynamics model where the dynamics of the state is modeled as a random walk (a discrete Wiener process). For each training point, the state at the starting time (e.g. t-Md) would be generated randomly. Then state values at the M subsequent time instants would be calculated according to the dynamics model, and sensor values would be calculated using the same or substantially similar simulation model as in the case of purely static feedforward nets. It is worth emphasizing again, that the training data generator may include, just as in purely static feedforward case, sensor noises and model uncertainties. Therefore, the trained net will be optimized with respect to those noises and uncertainties. This is an important aspect of this invention.

In describing an exemplary training technique for TDNNs, let us consider first a no-delay net with a single, scalar output, and no input delays at all. Each training point consists of the input to the net, which is a vector of N sensor values $Y=(y_1, y_2, \ldots, y_N)$, and of the corresponding output value z (in this case liquid quantity). The training set then consists of a large number of input-output pairs $(y^{(i)}, z^{(i)})$. These training points are generated using the system model. We define the underlying state vector x, which consists of quantities describing the properties of the tank that determine output of the sensors. State x would typically consist of tank attitude, liquid mass, liquid density, liquid temperature, etc. Then, for a given state value, sensor outputs are calculated as a (multidimensional) function $$y=g(x),$$

wherein the function g is a tank simulation model. It will typically be given as a hybrid of analytical expressions and a large number of interpolated look-up tables for height-volume transformations. To account for model uncertainties and sensor noises, randomly generated measurement error v should also be added to the simulated sensor outputs, resulting in the following calculation of sensor values:

$$y=g(x)+v.$$

The corresponding desired output value z is typically one of the components of state vector x and may be written as:

$$z=h(x)$$

with the understanding that the function h amounts simply to selecting one component from the state vector in the present example. In other cases, the function h may be more complex—for example, if z corresponds to liquid mass, but state vector x contains liquid volume and density instead, then the function h will be multiplication of those two components of state x. Still other cases are also possible, and in general, the function h may be arbitrarily complicated. However, it is preferred that the desired quantity of liquid z is already included within the state vector x, in which case the function h is simply a selection of that component from the vector.

To construct a training set for this net, one may first define the range or bounds of variability for each of the components of state vector x. Then, a large number (typically thousands or tens of thousands) of state vector values $x^{(i)}$ is randomly generated within those bounds. The particular probability distribution used to generate these state vectors $x^{(i)}$ will depend on the designer's belief about likely distribution of those values during the actual operation of the system, and will also reflect importance attached to those points. After the values $x^{(i)}$ are generated, the corresponding desired values of neural net output $z^{(i)}$ (values of liquid quantity) may be calculated using the expression:

$$z^{(i)}=h(x^{(i)}).$$

Then, the corresponding sensor output values may be calculated as $$y^{(i)}=g(x^{(i)})+v^{(i)}.$$

The final training set will be a collection of pairs $(y^{(i)}, z^{(i)})$, where $y^{(i)}$ is the input to the neural net and $z^{(i)}$ is the corresponding desired output.

Consider now the case of a TDNN with a single time delay as described supra in connection with the embodiment of FIG. 3. The net of this example is fed with sensor readings from two consecutive time instants. For simplicity, let us refer to those time instants as 1 and 2. Then, the input to this neural net is a vector resulting from concatenation of y(1) and y(2), and the output is the liquid quantity corresponding to the second time instant $$z=h(x(2)).$$

To calculate the sensor measurement signals y(1) and y(2), the underlying values of the state vector x(1) and x(2) may be defined in such a way that these two state values correspond to a physically likely transition in an actual tank. In other words, the tank model for the no-delay network may be augmented by a model of system dynamics. One form of such a dynamic model consists of two portions. A deterministic portion is characterized by a linear transformation matrix $\Phi$, which relates the state at the time instant k+1 to the previous value at time k. The other portion, referred to as a random portion consists of the addition of a random component w to each state transition. The dynamics model would have the form $$x(k+1)=\Phi x(k)+w.$$

A simple exemplary form of the dynamics model may be expressed by the equation:

$$x(k+1)=x(k)+w.$$

This model corresponds to a transition matrix $\Phi$ being the identity matrix. It expresses lack of definite knowledge about the system dynamics. Change in the state value between two consecutive time instants is modeled as a random vector w. Probability distribution of w describes knowledge about likely directions and rates of change. In technical terms, state x is modeled here as a Wiener process, resulting from integration of white noise w (the random vector w is assumed independent of state). This kind of a stochastic process is also known as random walk.

In a more general case, the dynamics model can have a nonlinear form $$x(k+1)=f(x(k),w).$$

Note that the two simplified dynamics model forms discussed above are in fact special cases of this general dynamics form. The choice of probability distribution of the random component w reflects uncertainty of the designer about the precise form of the model—the "wider" the distribution (large covariances, long tails, etc.) the less certain the model.

Form of the state dynamics model f is closely related to composition of the state vector x. If the dynamics model is of the special form (the random walk model), then the state components will probably be the same as in the previously discussed case of no-delay neural nets. If a more complicated dynamics model is used, then the state vector may be augmented by rates of change of quantities of interest—i.e. rate of change of liquid mass, rate of change of temperature, rate of change of density etc.

Assume now that the dynamics model x(k+1)=f(x(k),w) has already been defined. A first step in creation of the training set will be the same as in the case of no-delay networks. A large number of state vector values at the first time instant $x^{(i)}(1)$ will be randomly generated within the previously defined bounds. Then, the next step in the training set generation will be a calculation, for each state value $x^{(i)}(1)$, of the corresponding subsequent state value $$x^{(i)}(2)=f(x^{(i)}(1),w).$$

Here, $w^{(i)}$ is the random noise value, generated independently for each training point. The next step will be to calculate the corresponding sensor output values as $$y^{(i)}(1)=g(x^{(i)}(1))+v,$$

and $$y^{(i)}(2)=g(x^{(i)}(2))+v.$$

Also, the corresponding desired output of the neural net may be calculated as $$z^{(i)}=h(x^{(i)}(2)).$$

The final training set may be a collection of triples ($y^{(i)}(1)$, $y^{(i)}(2)$, $z^{(i)}$), where $y^{(i)}(1)$ and $y^{(i)}(2)$ jointly constitute input to the neural net.

Consider now the general case of TDNN with a larger number of delays, M>1. Then, the input vector to the net consists of sensor measurements from times 1,2,3, . . . , M+1. The only difference between this case and the simpler case with a single delay (M=1) is that now for each training point we need M+1 state values x(k), k=1, . . . , M+1. The process of training set generation is almost identical to the one described before. First, a large collection of state values $x^{(i)}(1)$ are generated randomly corresponding to the first time instant. Then, based on these starting values, state values corresponding to consecutive time instants 2, 3, . . . , M+1 are generated by iterating M times the state transition function $$x^{(i)}(k+1)=f(x^{(i)}(k),w) k=1, \ldots, M.$$

In this expression, w is the random quantity generated independently for each state transition and for each training point. The next step is to calculate a sensor measurement value for each training point and for each time instant $$y^{(i)}(k)=g(x^{(i)}(k))+v.$$

Here, v is the random sensor noise, also generated independently for each time index and for each training point. Finally, the desired output is calculated based on the state value at the last time index $$z^{(i)}=h(x^{(i)}(M+1)).$$

The final training set will be a collection of a large number of M+2-tuples ($y^{(i)}(1)$, $y^{(i)}(2)$, . . . , $y^{(i)}(M)$, $y^{(i)}(M+1)$, $z^{(i)}$), where M+1 input values from $y^{(i)}(1)$ to $y^{(i)}(M+1)$ jointly constitute input to the neural net. Once the training set is constructed, the training of the net is performed exactly in the same way as in case of a no-delay net.

Note that introduction of delayed inputs to TDNN will probably require a significant increase in number of training points and consequently in training time.

The weights are all randomly assigned prior to training, and the training may be achieved using the back propagation algorithm as taught in PARALLEL DISTRIBUTED PROCESSING, Rumelhart, et al., The MIT Press, Cambridge, Mass. (1988) or other suitable training algorithms, like the training algorithm taught in FUNDAMENTALS OF ARTIFICIAL NEURAL NETWORKS, Hassoun, The MIT Press, Cambridge, Mass. (1995). After training, the weights are stored and remain fixed. The neural net then operates in real time using current and past data from the measurement vector $z_m$ and directly computes the current output $QT_1$. If desired, the output layer can include more output nodes to provide a determination of parametric values such as density, temperature, pressure and acceleration, for example, requiring a more extensive training process. For a more detailed description of the training of neural networks reference is made to the copending U.S. patent application bearing application Ser. No. 08/996,858.

For TDNN to offer substantial advantages over a static feedforward net, it should capture the dynamic behavior of the system in question. This means that the number of tapped delay lines M and the delay d must be such that it is possible to reconstruct the quantity of interest from the measurements. Qualitatively, the longest input delay, that is Md, should be smaller than "memory" of the system—that is the time after which the past measurements do not contain any useful information about the current state. Similarly, it should be long enough that the input to TDNN captures the slowest mode of the system dynamics pertinent to the estimated quantity (liquid mass or volume).

While the present invention has been described herein in connection with a number of embodiments, it is understood that such invention should not be limited in any way to any single embodiment, but rather construed in breadth and broad scope in accordance with the recitation of the appended claims.

We claim:

1. Liquid gauging apparatus using a time delay neural network for determining a quantity of liquid in a container that is not directly measurable by sensors, said apparatus comprising:
    a plurality of sensors; each of said sensors for measuring a respective parameter of said liquid and for producing a time varying sensor output signal representative of the respective parameter measured thereby; and
    processing means for processing said sensor output signals by a time delay neural network algorithm to determine a current quantity of the liquid in the container based on current and past parameter measurements of said sensor output signals.

2. The apparatus of claim 1 wherein the processing means processes by the time delay neural network algorithm a predetermined number of parameter measurements of each of the sensors based on a sliding window in time.

3. The apparatus of claim 1 wherein the processing means includes a programmed processor comprising the time delay neural network algorithm for processing current and past parameter measurements of the sensor output signals to determine the current quantity of liquid.

4. The apparatus of claim 1 wherein the liquid comprises aircraft fuel and the container comprises an aircraft fuel tank.

5. The apparatus of claim 1 wherein said measured parameters of the liquid are selected from the following group: temperature, pressure, echo travel time, acceleration, and capacitance.

6. The apparatus of claim 1 wherein the neural network algorithm produces an output that corresponds to a current volume of the liquid in the container.

7. The apparatus of claim 1 wherein the neural network algorithm produces an output that corresponds to a current mass of the liquid in the container.

8. The apparatus of claim 1 wherein the neural network algorithm characterizes a neural network that comprises a number of input nodes corresponding to said current and past parameter measurements, and at least one hidden layer of nodes and an output layer with at least one node corresponding to the output.

9. The apparatus of claim 1 wherein the processing means includes at least one time delay means associated with at least one sensor for delaying said corresponding current sensor output at least one predetermined time increment and producing a signal representative of a past parameter measurement for each delayed time increment.

10. The apparatus of claim 9 wherein some sensors of the plurality may have no delay means associated therewith.

11. The apparatus of claim 9 wherein the predetermined time delay increment of one sensor output may be set not equal to the predetermined time delay increment of another sensor output.

12. The apparatus of claim 1 wherein said time delay neural network algorithm is trained using training data sets of values for said current and past parameter measurements and said determined quantity.

13. The apparatus of claim 12 herein the training data sets of the time delay neural network algorithm are derived from a dynamic system computer model.

14. The apparatus of claim 13 wherein the dynamic system model includes a model of the container.

15. The apparatus of claim 1 wherein the processing means includes means for storing sensor output signals representative of past parameter measurements of the liquid.

16. The apparatus of claim 15 wherein the processing means includes means for sampling the time varying sensor output signals to provide current and past parameter measurements of the plurality of sensors for storage and processing in the processing means.

17. The apparatus of claim 16 wherein a rate of sampling of said sampling means for the sensor output signals is based on a predetermined time delay increment for each respective sensor being sampled.

18. The apparatus of claim 17 wherein some sensors of the plurality may not provide any past parameter measurements.

19. The apparatus of claim 17 wherein the predetermined time delay increment of one sensor output may be set not equal to the predetermined time delay increment of another sensor output.

20. Liquid gauging apparatus using a time delay neural network for determining a quantity of liquid in a container that is not directly measurable by sensors, said apparatus comprising:
    a plurality of sensors; each of said sensors for measuring a respective parameter of said liquid and for producing a time variable sensor output signal representative of its measured parameter;
    means for providing past sensor output signals in relation to a current output signal of said plurality of sensors; and
    time delay neural network means for processing said current output signals and said past output signals of said plurality of sensors to determine a current quantity of the liquid in the container.

21. The apparatus of claim 20 wherein the liquid comprises aircraft fuel and the container comprises an aircraft fuel tank.

22. The apparatus of claim 20 wherein said measured parameters of the liquid are selected from the following group: temperature, pressure, echo travel time, acceleration, and capacitance.

23. The apparatus of claim 20 wherein the neural network means produces an output that corresponds to a current volume of liquid in the container.

24. The apparatus of claim 20 wherein the neural network means produces an output that corresponds to a current mass of the liquid in the container.

25. The apparatus of claim 20 wherein the neural network means comprises a number of input nodes corresponding to said current and past sensor output signals, and at least one hidden layer of nodes and an output layer with at least one node corresponding to the output.

26. The apparatus of claim 20 wherein said plurality of sensors comprise ultrasonic liquid level sensors, at least one temperature sensor, at least one pressure sensor, and at least one accelerometer.

27. The apparatus of claim 20 wherein the plurality of sensors measure parameters that provide characteristics of a surface plane of the liquid; and wherein the neural network means produces an output representative of the current liquid volume in the container based on current and past measured parameters.

28. The apparatus of claim 20 wherein said sensors are non-intrusive with respect to the container.

29. The apparatus of claim 28 wherein said non-intrusive sensors comprise an ultrasonic liquid level sensor for transmitting acoustic energy into the container from a sensor location outside the container.

30. The apparatus of claim 20 wherein said plurality of sensors include at least two sensors that measure a common parameter of the liquid at different locations in the container.

31. The apparatus of claim 30 wherein the at least two sensors are capacitive probe sensors disposed at different locations in the container to measure height of the liquid at said corresponding locations and to produce output signals representative thereof.

32. The apparatus of claim 30 wherein the at least two sensors are ultrasonic transducers disposed at different locations in the container to measure height of the liquid at said corresponding locations and to produce output signals representative thereof.

33. The liquid gauging system of claim 20 wherein the providing means includes at least one time delay means associated with each sensor for delaying the current output signal of said corresponding sensor at least one predetermined time increment and producing a past sensor output signal for each delayed time increment.

34. The apparatus of claim 33 wherein some sensors of the plurality may not produce any delayed sensor output signals.

35. The apparatus of claim 33 wherein the predetermined time delay increment of one sensor output may not be equal to the predetermined time delay increment of another sensor output.

36. The apparatus of claim 20 wherein the time delay neural network means includes a programmed processor comprising an algorithm based on a time delay neural network for processing the current and past sensor output signals by said time delay neural network algorithm.

37. The apparatus of claim 36 wherein said time delay neural network algorithm is trained using training data sets of values for said current and past sensor outputs and said determined quantity.

38. The apparatus of claim 37 wherein the training data sets are derived from a dynamic system computer model.

39. The apparatus of claim 38 wherein the dynamic system computer model includes a geometric model of the container.

40. The apparatus of claim 20 wherein the plurality of sensors are grouped in a plurality of sensor suites, with each sensor suite measuring parameters of the liquid which are sufficient to determine said quantity of the liquid.

41. The apparatus of claim 40 wherein at least one of the sensor suites comprises one or more of the following: an ultrasonic liquid level sensor, a temperature sensor and an accelerometer.

42. The apparatus of claim 40 wherein at least two sensor suites measure similar parametric properties of the liquid at different locations in the container to provide redundant data for the neural network means.

43. The apparatus of claim 40 wherein at least one of said sensor suites comprises one or more of the following: a pressure sensor, a temperature sensor and an accelerometer.

44. A method of training a time delay neural network algorithm for computing a quantity of liquid in a container from current and past liquid parameter sensor measurements, said method comprising the steps of:

establishing a dynamic model of liquid behavior in the container and parameter measurements of said liquid behavior sensed by a plurality of sensors;

deriving from said dynamic model training data sets for a plurality of liquid quantity values, each said data set comprising current and past liquid parameter sensor measurement values corresponding to a liquid quantity value of the plurality, and said corresponding liquid quantity value; and training said time delay neural network algorithm with said derived training data sets.

45. The method of claim 44 wherein the dynamic model characterizes a state of the liquid in the container at a first predetermined time t1 and a change in said state over a predetermined increment in time d to derive a state of the liquid at a second predetermined time t2=t1+d; and wherein the states of the liquid at times t1 and t2 are represented by values of state vectors x(1) and x(2), respectively.

46. The method of claim 45 wherein the transition from state vector x(1) to state vector x(2) is determined from the dynamic model based on a function of the state vector x(1) including a deterministic portion and a random portion.

47. The method of claim 46 wherein the deterministic portion of said function is based on a knowledge of the dynamics of the state of the liquid over time.

48. The method of claim 46 wherein the random portion of said function is based on a random expression for said given transition from state vector x(1) to state vector x(2).

49. The method of claim 48 wherein the random expression is a probability distribution of the direction and rate of change of state vector x(1).

50. The method of claim 44 wherein the step of deriving includes the steps of:

(a) determining a state of the liquid in the container at an initial time instant t0 represented by values of a state vector x(0);

(b) determining states of the liquid at subsequent times t(n)=t0+nd, for n=1 to M, where d is a predetermined time increment, from said state vector x(n−1) using the dynamic model, said state at t(n) represented by values of a state vector x(n);

(c) determining values of parameter measurements of said plurality of sensors at times t(i) based on a first function of said values of the state vector x(i), respectively, where i is an integer ranging from 0 to M; and (d) determining liquid quantity values at times t(i) based on a second function of said values of the state vectors x(i), respectively, whereby said determined parameter measurement values and liquid quantity values for times t(i) become part of the training data sets for the time delay neural network algorithm.

51. The method of claim 50 wherein the state of the liquid in the container at the initial time instant t0 is determined by random generation within predefined bounds of variability of a liquid state in the container.

52. The method of claim 50 wherein each state x(n) of the liquid at the subsequent time t(n) is determined as a function of state x(n−1) that includes a random noise expression.

53. The method of claim 52 wherein the random noise expression is derived independently for the specific transition between states x(n−1) and x(n).

54. The method of claim 50 wherein the first function of the step of determining values of parameter measurements includes a random noise expression.

55. The method of claim 54 wherein the random noise expression of the first function is derived independently for each time instant and for each training data set.

* * * * *

UNITED STATES PATENT AND TRADEMARK OFFICE
CERTIFICATE OF CORRECTION

PATENT NO. : 6,577,960 B1
DATED : June 10, 2003
INVENTOR(S) : Luis Rabelo, Mark Walker and Radoslaw Zakrzewski It is certified that error appears in the above-identified patent and that said Letters Patent is hereby corrected as shown below:

Title page,
Item [75], Inventors, "Zakrewski" should read -- Zakrzewski --;

Column 15,
Line 21, "that is not directly measurable by sensors" should be deleted;
Line 27, after "processing means for processing" insert -- current and past parameter measurements of --;
Line 30, delete "based on current and past parameter measurements of said sensor output signals" and insert -- that is not directly measurable by any of the sensors of said plurality --.

Column 16,
Line 9, "herein" should read -- wherein --;
Line 34, "that is not directly measurable by sensors" should be deleted;
Line 45, after "container" insert -- that is not directly measurable by any of the sensors of said plurality --.

Signed and Sealed this

Fifteenth Day of March, 2005

JON W. DUDAS
*Director of the United States Patent and Trademark Office*